Jan. 11, 1927.　　　H. KATTWINKEL　　　1,614,200
MANUFACTURE OF FRICTION BODIES FOR BRAKES AND CLUTCHES
Filed May 2, 1925　　　2 Sheets-Sheet 1

Inventor:
H. Kattwinkel

Jan. 11, 1927. 1,614,200
H. KATTWINKEL
MANUFACTURE OF FRICTION BODIES FOR BRAKES AND CLUTCHES
Filed May 2, 1925 2 Sheets-Sheet 2
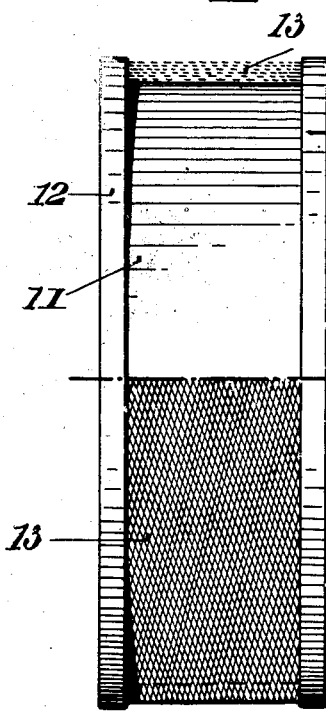
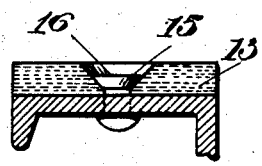
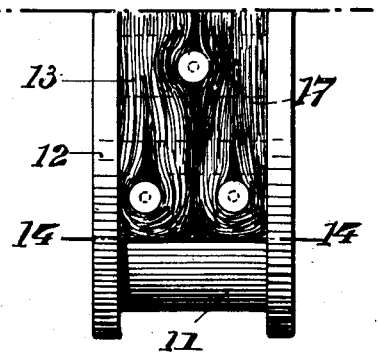
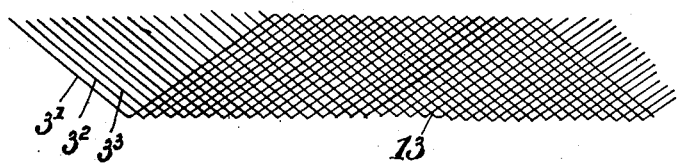
Inventor:
H. Kattwinkel Patented Jan. 11, 1927.

1,614,200

UNITED STATES PATENT OFFICE.

HANS KATTWINKEL, OF COSWIG, GERMANY.

MANUFACTURE OF FRICTION BODIES FOR BRAKES AND CLUTCHES.

Application filed May 2, 1925, Serial No. 27,525, and in Germany May 1, 1924.

My invention refers to improvements in friction bodies and method of making same, and relates more particularly to friction bodies adapted for use in connection with brakes and clutches in motor cars and the like.

The manufacture of the friction bodies or friction facings of brakes, friction clutches and the like, out of asbestos or cotton fabric, wire netting or the like, which by impregnation with natural or artificial resins, bakelite, varnish and the like, and subsequent hardening, receives properties which render it particularly suitable for the purposes indicated, is known. Hitherto such friction bodies have commonly been cut or stamped out of impregnated fabric manufactured in the ordinary course of industry. This method of manufacture presents the great disadvantage that the fibres of the fabric in question are for the most part unfavourably stressed by the forces exerted when the friction body is in use, inasmuch as the main tensile forces occurring only coincide in part with the longitudinal direction of the fabric.

According to my present invention this disadvantage is obviated by the fact that the friction bodies are not cut out of the finished fabric but are formed directly by winding or stretching cords, threads or wires of the material in question on suitably shaped formers, in such a way that the threads or the like run one above another in a plurality of layers substantially parallel to the former in question, and accordingly coincide substantially with the direction of the frictional stresses mainly occurring in use. The new method of manufacture offers the further advantage of great simplicity and cheapness, and also the possibility of determining at will within certain limits the thickness of the friction body to be manufactured, and also its shape, more particularly its cross sectional form, without impairing the cohesion and integrity of the material in the manner hitherto necessary, and without composing the friction body of a plurality of separate pieces or layers. Further improvements relate to the provision of the holes which serve for the reception of the rivets or screws for fastening the friction bodies to their supports.

In the accompanying drawings my invention is illustrated by way of example in a number of constructional forms.

Figure 3 shows a winding former serving for the manufacture of a hoop-shaped friction body.

Figure 4 illustrates diagrammatically on a larger scale the intersecting turns of the winding applied to the former shown in Figure 3.

Figure 5 illustrates a further form of the method of winding together with the application of the rivet holes; while Figure 6 illustrates in cross section a friction body provided with a rivet hole according to the invention and riveted fast to its carrier.

Figures 1, 2:
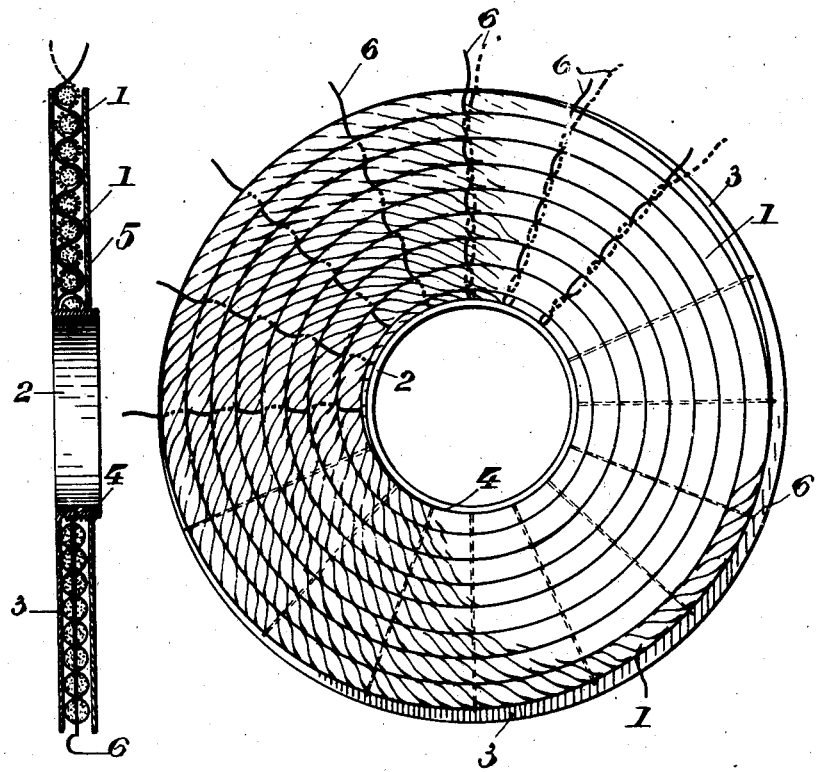
Figures 1 and 2 show in side elevation and in central section respectively an annular disc-shaped friction body made according to the invention.

In the form of the process illustrated in Figures 1 and 2, where it is a question of making a disc-shaped friction body, a cord 1, made for example of asbestos fibres in a known manner, is wound on to a flat spool 2. This spool consists of a hub member 4 rigidly connected with one flange 3, while the other flange 5 may be removably secured to the said hub member for example by screwing or otherwise. When winding on the asbestos cord 1 its inner end is secured to the hub member 4 and the winding is then begun. At this stage threads or wires 6, as indicated in the upper part of Figures 1 and 2 may be wound in with the cord. This may for example be done in such a way that at each turn the thread in question is passed from one side to the other over the asbestos cord, so that it runs in a serpentine path as shown in the upper part of Figure 2, thus corresponding to a certain extent to the weft thread of an ordinary fabric. Such threads may be provided, as indicated in Figure 1, at various points on the periphery.

The connecting of the turns of cord in a radial direction by means of special threads or wires is however not absolutely necessary, if a suitable impregnating medium is employed for the fibrous material. For this purpose there may be employed the media commonly used at present in the manufacture of such brake linings, such as india-rubber or resin solutions, bakelite, varnish and the like. The impregnating may be effected either before the winding or subsequently. In either case it is associated with heavy pressure, by means of which, after the hardening, which is promoted by a drying process preferably carried through at a high temperature, a disc body is obtained, which is not only capable of withstanding easily tangential stresses but which can also bear sufficiently well any radial stresses. If the disc body is also reinforced, in the manner described above, by insertions running radially, it is capable of bearing also the bending and other stresses acting in a radial direction that occur with the roughest handling. Such a disc body is for example very well adapted for use as a friction disc in the so-called laminated or multiple-disc clutches.

Instead of asbestos cords, threads or cords of other fibrous material, as well as metallic wires, may of course be employed in the manufacture of the disc bodies. When employing asbestos cords these preferably receive, in a known manner with a view to increasing their tensile strength, an inlay of hemp or cotton threads or thin brass wire. Of course when it is a question of manufacturing stronger discs a plurality of threads or cords may be wound on side by side, the connecting of the individual turns being again effected in the manner described above.

If it is a question of manufacturing hoop-shaped or hollow cylindrical friction bodies, such for example as are used in the drum brakes that are usual in motor vehicles, a winding former according to Figure 3 is preferably utilized. This former is essentially distinguished from the one described however by the fact that the cylindrical part 11 is kept wider and the flanges 12 lower. The winding of the threads 13, consisting for example of hempen cords or brass wire, is here effected according to a preferred form of the process in such a manner that the threads are allowed to run in flat zig-zag lines which are carried from one flange of the drum to the other, in such a way that the threads of two superposed layers of the winding cross one another, in the same way when winding yarn in the making of the so-called cross spools. In Figure 4 the method of winding is diagrammatically illustrated. The angles of the zig-zag lines are however here shown greatly exaggerated for the sake of clearness. In point of fact the zig-zag lines are substantially flatter and preferably run in such a way that the thread only runs backwards and forwards once or twice in one complete revolution of the winding former. It is then not necessary to fasten the thread in any particular manner at the vertices of the zig-zag turns.

By the mutual crossing of the threads of the various winding layers the result is obtained that the finished winding body also receives sufficient strength in the axial direction without the taking up of the tensile forces chiefly operative in working by the threads in the main direction of stress, being seriously impaired. After the impregnating and hardening of the winding body, which may be effected in the usual way by applying heat and heavy pressure, the crossing threads adhere very firmly to one another, so that the employment of special weft threads is superfluous. The hoop-shaped winding body is preferably cut up after impregnation and hardening to the length desired for the brake bodies in question.

In Figure 5 is illustrated how the winding can be constructed without the individual turns crossing. In this case it is advisable to wind in weft threads 17 running backwards and forwards in an axial direction in order to enhance the cohesion of the turns in this direction. The figure also shows that it is not absolutely essential to let the threads forming the web run endlessly over the periphery of the winding drum, but the threads may be led back to a point indicated in Figure 5 by the line 14—14, and on to a point lying on the other side of the line 14—14, from which the thread is then led back once more, and so on until the winding is completed. It is in this case possible during the winding—and the same remark also applies to the method of winding according to Figures 1 to 4—to take into consideration equally the countersunk holes 16 in the finished brake body required for the reception of the fastening rivets 15, in which brake body correspondingly shaped former bodies are fastened at the points in question in the winding drum 11, and the winding threads are led round these bodies in the manner shown in Figure 5. In this case there occur in the immediate neighborhood of the former body strengthenings which are of importance for the holding power of the holes stressed by the rivets 16.

These rivet holes which have hitherto been produced by stamping or boring, may also be made by pressing in the ready wound brake body by means of correspondingly shaped mandrels or nipples, so long as the winding body, after impregnation is still in a soft condition. This pressing is preferably effected in the same mould in which the brake body receives its final shape and is hardened.

The subsequent pressing of the rivet holes in the impregnated but still soft brake body is of course of importance not only for brake bodies made from threads by winding on but quite generally for frictional linings of a more or less fibrous structure prepared from web-like material. By the boring of the rivet holes which has hitherto been usual the cohesion or continuity of the threads or wires forming the brake material was interrupted at the points in question and its strength thereby decreased. Furthermore it often happened, with the method of manufacture hitherto customary, that the inlays of the brake bodies, consisting for example of wires, which were interrupted by the boring, projected from the frictional surface, and caused the formation of deep grooves in the brake drum co-operating with the friction body. By the new process not only are these objections overcome but an appreciable strengthening at these particularly heavily stressed points is produced by the thickening of the material in the neighbourhood of the rivet holes. Furthermore it is easily possible to make the countersinking of the hole that takes the rivet head so deep that the rivet head stands back some distance behind the surface of the friction body, so that the rivet head does not come into contact with the brake drum and damage it, as has hitherto been the case after very slight wear of the friction lining.

By the term fabric in the following claims are to be understood such thread textures as are produced by stretching or winding threads, cords or wires according to the process illustrated in the drawings. Thus it is not only fabrics in the strict sense of the word that are meant. Also by the term thread are to be understood not only threads in the narrow sense but also wires, cords and like flexible products of great longitudinal extension and small width.

I claim:—

1. A method of manufacturing frictional bodies for brakes, friction clutches, consisting in stretching threads in a plurality of layers upon a support, embedding bodies shaped to correspond to the form of rivet holes into the layers of threads, impregnating the product thus obtained and hardening the impregnating medium.

2. A method of manufacturing frictional bodies for brakes, friction clutches, consisting in winding threads side by side and in a plurality of layers on a cylindrical former in such a way that the individual turns cross one another, embedding bodies shaped to correspond to the form of rivet holes into the winding, impregnating the product thus obtained and hardening the impregnating medium.

3. A method of manufacturing frictional bodies for brakes, friction clutches, consisting in stretching threads in a plurality of layers upon a support, impregnating the product thus obtained, embedding bodies shaped to correspond to the form of rivet holes into the product, hardening the impregnating medium and then removing said bodies.

4. A method of manufacturing frictional bodies for brakes, friction clutches, consisting in impregnating a fabric, embedding rivet shaped bodies into said fabric and hardening the impregnating medium.

5. A method of manufacturing frictional bodies for brakes, friction clutches, consisting in embedding rivet shaped bodies into a fabric, impregnating said fabric, hardening the impregnating medium, and then removing said bodies.

6. A method of manufacturing frictional bodies for brakes, friction clutches, consisting in forming holes for receiving connecting means in a fabric without violating the threads of said fabric and then cause the product to harden.

7. A method of manufacturing frictional bodies for brakes, friction clutches, consisting in impregnating a fabric, forming rivet holes in said fabric by pressing aside the threads of the fabric and condensing them, and then hardening the impregnating medium.

8. A friction body comprising an impregnated fabric, holes for receiving connecting means within said fabric, said holes leaving the threads of said fabric unviolated.

9. A friction body comprising an impregnated fabric, holes extending through said fabric, the fabric adjacent said holes being pressed aside and condensed.

10. A friction body comprising an impregnated and then hardened fabric comprising a plurality of layers of threads, counter sunk rivet holes within said fabric, said holes leaving the threads of the fabric unviolated, the fabric adjacent said holes being pressed aside and condensed.

11. A method of manufacturing frictional bodies for brakes, friction clutches, consisting in embedding rivet shaped bodies into a fabric, causing said fabric to harden, and then removing said bodies.

In testimony whereof I have signed my name to this specification.

HANS KATTWINKEL.